United States Patent Office 3,061,557
Patented Oct. 30, 1962

3,061,557
METHOD OF REACTING AN ACTIVE HYDROGEN CONTAINING COMPOUND WITH AN ISOCYANATE OR ISOTHIOCYANATE IN CONTACT WITH A POLYSTANNATE CATALYST
Fritz Hostettler, Charleston, and Eugene F. Cox, South Charleston, W. Va., assignors to Union Carbide Corporation, a corporation of New York
No Drawing. Filed Dec. 12, 1957, Ser. No. 702,241
2 Claims. (Cl. 260—2.5)

This invention relates to methods for accelerating reactions of organic compounds having reactive groups of the formula —NCY, in which Y is oxygen or sulfur, with compounds having groups containing reactive hydrogen as determined by the Zerewitinoff method described in J. Am. Chem. Soc., vol 49, page 3181 (1927). These methods are generically useful in promoting reactions of isocyanates and isothiocyanates with a wide variety of active hydrogen-containing compounds and have found particular and immediate applicability in the preparation of polyurethanes, a broad class of organic polymers formed by reactions of di- or polyisocyanates or di- or polyisothiocyanates with a large variety of difunctional or polyfunctional compounds having hydroxyl or amino groups containing active hydrogen, e.g., water, polyols, polyamines, polyethers, polyesters, polyoxy-carbooxy alkylenes, and the like.

A very considerable number of materials have theretofore been proposed as catalysts for accelerating isocyanate reactions generally and polyurethane preparation in particular. One of the most important disadvantages that is common to all but a few of the catalysts known to have been proposed is that they do not accelerate the reaction sufficiently to bring it within the realm of practical utility. Tertiary amines, the most popular catalysts known to have been proposed heretofore, provides low reaction rates unless used in unsatisfactorily large amounts, typical formulations requiring one to three parts by weight of amine per 100 parts of total composition. Another very important disadvantage of proposed catalysts, including tertiary amines, is that they require elevated temperatures in reactions involving aromatic isocyanates and are essentially inactive in promoting reactions of aliphatic isocyanates at any reasonable temperature. Tertiary amines often impart an undesirable odor to reaction products of isocyanates with active hydrogen-containing compounds and, due to their basic characteristics, catalyze the degradation of the reaction products or polymers once they are formed. Cobalt naphthenate, another popular catalyst, has the disadvantage of imparting undesired color to the reaction product and of requiring a petroleum base solvent which leads to the formation of tacky foams of relatively high density. Strong bases such as sodium hydroxide, which provide greater acceleration, frequently lead to uncontrollable reactions, particularly in forming polyurethane foams, and bring about excess cross linking. Ferric acetylacetonate, a compound considered to be non-organometallic because of the absence of any carbon to metal bond, is active but has the disadvantages of being colored and of being catalytically active in oxidative degradation of organic compounds.

Other disadvantages of heretofore proposed catalysts include discoloration, particularly yellowing on aging of the reaction products, poor control over the progress of the reaction and a tendency to require use of high temperatures to bring about a satisfactory rate of reaction.

We have found that compounds of lead that are organic in the sense that they contain a direct bond between a lead atom and a carbon atom of an organic radical; organic halides of titanium; the inorganic halides of tetravalent tin, arsenic, antimony, bismuth and titanium; polystannates; tin, titanium and copper chelates; and mercury salts are surprisingly effective in accelerating reactions of organic compounds having one or more reactive NCY groups, in which Y is oxygen or sulfur, with compounds having groups containing active hydrogen. Reaction rates that are obtainable in accordance with the method of the invention are in most instances very much higher than rates achieved with the best catalysts heretofore proposed. These catalysts can be used in small concentrations; have no tendency to degrade a polymer after it is formed; generally introduce no troublesome odor problems; permit reactions at practicable and controllable rates without, in most instances, requiring heating of the reactants; and broaden the field of useful isocyanates for polyurethane formation to include such relatively nonreactive materials as aliphatic isocyanates and isothiocyanates. They are particularly effective in the preparation of rigid foams.

The following are typical compounds that are suitable as catalysts in accordance with this invention: stannic chloride, stannic bromide, stannic iodide, stannic fluoride, isopropoxystearoxy polystannate, hydroxystearoxy polystannate, tin chelates such as bis(acetylacetone)tin dichloride, arsenic trichloride, antimony trichloride, antimony pentachloride, bismuth trichloride, titanium tetrachloride, bis(cyclopentadienyl)titanium difluoride, titanium chelates such as octylene glycol titanate, dioctyl lead dichloride, dioctyl lead diacetate, dioctyl lead oxide, trioctyl lead chloride, trioctyl lead hydroxide, trioctyl lead acetate, copper chelates such as copper acetylacetonate, and mercury salts.

It is to be understood that organic radicals linked to the metal atoms need not be the same in any given compound and that the structure of the compound need not in any sense be symmetrical.

The ability of representative metal compounds to accelerate isocyanate reactions is demonstrated by reacting phenyl isocyanate with methanol under essentially identical and controlled conditions. This reaction is important in such processes as the formation of polyurethanes by reaction of isocyanates with polyethers or polyesters. These tests were carried out in each instance by admixing equimolar amounts of phenyl isocyanate and methanol in n-butyl ether as solvent, adding a different catalyst to the mixture, and observing the rate of reaction at 30° C. The reaction, catalysts and relative rates based on one mol percent of catalyst per mol of isocyanate are shown immediately below.

(I) $$C_6H_5NCO + CH_3OH \xrightarrow[30°\ C.]{(C_4H_9)_2O} C_6H_5NHCOOCH$$

Catalyst: Relative rate
None _____ 1
p-Toluenesulfonic acid _____ 2
Acetic acid _____ 3
N-methylmorpholine _____ 3
Triethylamine _____ 11
Triphenylamine _____ 1.5
Stannic chloride _____ 100
Stannic bromide _____ 700
Stannic iodide _____ 270
Stannic fluoride _____ 39
Isopropoxystearoxy polystannate _____ 120
Bis(acetylacetone)tin dichloride _____ 300
Antimony trichloride _____ 130
Antimony pentachloride _____ 17
Titanium tetrachloride _____ 130

This data indicates that representative metal compounds such as isopropoxystearoxy polystannate, stannic bromide, stannic iodide, titanium tetrachloride and antimony trichloride are more than ten times as active as triethylamine and in some instances a hundred times more active than N-methylmorpholine, a catalyst often suggested for isocyanate reactions.

When the same reaction is carried out in dioxane as solvent, the results are:

(II) $C_6H_5NCO + CH_3OH \xrightarrow[30°\ C.]{C_4H_8O_2} C_6H_5NHCOOCH_3$

| Catalyst: | Relative rate |
|---|---|
| None | 1 |
| Triethylamine | 100 |
| Bismuth trichloride | 170 |
| Trioctyl lead chloride | 210 |
| Copper acetylacetonate | 380 |

This data shows the catalytic activity of a compound representative of the metal compounds of the invention also to be highly effective when the reaction is carried out in dioxane under otherwise similar conditions. The reaction accelerated was chosen to provide accurate means for comparison of reaction rates under carefully controlled conditions and as a guide to the magnitude of "catalytic amounts" involved without in any sense being considered limitative of the scope of the invention.

The terms "isocyanate" and "isothiocyanates" are used herein to refer to mono- and polyisocyanates and to mono- and polyisothiocyanates, respectively, including particularly diisocyanates and diisothiocyanates. While the invention has been described specifically with reference to the reaction of certain monoisocyanates, diisocyanates and monoisothiocyanates, it is generally applicable to the reaction of any compound containing one or more —N=C=Y groups in which Y is oxygen or sulfur. Compounds within this generic definition include monoisocyanates and monoisothiocyanates of the general formula

RNCY in which R is a hydrocarbon or substituted hydrocarbon radical such as alkyl, cycloalkyl, alkenyl, alkynyl, aralkyl, aryl, alkaryl, or a substituted analogue thereof. Examples of such compounds include methyl isocyanate, ethyl isocyanate, butyl isocyanate, octyl isocyanate, octadecyl isocyanate, vinyl isocyanate, isopropenyl isocyanate, ethynyl isocyanate, benzyl isocyanate, phenyl isocyanate, vinylphenyl isocyanate, tolyl isocyanate, ethyl isothiocyanate and phenyl isothiocyanate. Also included are polyisocyanates and polyisothiocyanates of the general formula $R(NCY)_x$ in which $x$ is two or more and R can be alkylene, substituted alkylene, arylene, substituted arylene, a hydrocarbon or substituted hydrocarbon containing one or more aryl-NCY bonds and one or more alkyl-NCY bonds, a hydrocarbon or substituted hydrocarbon containing a plurality of either aryl-NCY or alkyl-NCY bonds. R can also include radicals such as —R—Z—R— where Z may be any divalent moiety such as —O—,

—O—R—O—

—CO—, —CO$_2$—, —S—, —S—R—S—, —SO$_2$—, etc. Examples of such compounds include hexamethylene diisocyanate, 1,8-diisocyanato-p-menthane, xylylene diisocyanates, (OCNCH$_2$CH$_2$CH$_2$OCH$_2$)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, xylylene-alpha,alpha',-diisothiocyanate, and isopropylbenzene-alpha,4-diisocyanate.

Further included are dimers and trimers of isocyanates and diisocyanates and polymeric diisocyanates of the general formulae $(RNCY)_x$ and $[R(NCY)_x]_y$ in which $x$ and $y$ are two or more, as well as compounds of the general formula M(NCY)$_x$ in which $x$ is one or more and M is a monofunctional or polyfunctional atom or group. Examples of this type include ethylphosphonic diisocyanate, C$_2$H$_5$P(O)(NCO)$_2$; phenylphosphonous diisocyanate, C$_6$H$_5$P(NCO)$_2$; compounds containing a ≡Si—NCY group, isocyanates derived from sulfonamides (RSO$_2$NCO), cyanic acid, thiocyanic acid, and compounds containing a metal-NCY group such as tributyltin isocyanate.

It is also to be understood that the active hydrogen-containing compounds that are capable of reacting with isocyanates in accordance with the method of the invention are by no means limited to compounds containing hydroxyl and amino groups but generically include all compounds which give a positive test for reactive hydrogen as determined by the Zerewitinoff method. Typical of the active hydrogen-containing compounds whose reaction with isocyanates and isothiocyanates may be accelerated and in some instances even made possible are compounds containing an oxygen-hydrogen bond, such as water, hydrogen peroxide, alcohols, hydroperoxides, phenols, boronic acids, carboxylic acids, percarboxylic acids and sulfonic acids; compounds containing a nitrogen-hydrogen bond, such as ammonia, amines, amides, lactams, ureas, urethanes, allophanates, biurets, acyl ureas, thioureas, hydrazines, oximes, amidines, hydroxylamines, hydrazones, hydroxamic acids, nitramines, diazoamino compounds, and sulfonamides; compounds containing a sulfur-hydrogen bond, such as mercaptans, thiophenols and thioacids; halogen acids; compounds containing active methylene groups and compounds capable of forming enols such as acetone, malonic esters, acetoacetic esters, acetylacetone and nitromethane; and miscellaneous active hydrogen-containing compounds, such as acetylenic compounds and dialkyl phosphonates. Also included among the applicable active hydrogen-containing compounds are compounds containing two or more of any one or combination of active hydrogen groups already described. Examples include ethylene glycol, diethylene glycol, hexamethylene glycol, glycerol, 1,2,6-hexanetriol, sorbitol, dextrin, starch, cellulose, polyvinyl alcohol, ethylene-vinyl alcohol copolymers, cellulose acetate, shellac, castor oil, polyesters, alkyd resins, polyvinyl acetals, polyvinyl ketals, polyethers, polyetheresters, polyacrylic acids, ethylene diamine, hexamethylene diamine, ethanolamines, polyesteramides, poly(hexamethylene adipamide), wool, and proteins. Materials such as glass and metal which have thin films of moisture on their surfaces at the time of reaction with an isocyanate or isothiocyanate are also included.

The method of the invention is particularly suitable for reaction of organic polyisocyanates with high molecular weight polymers having at least two end groups containing reactive hydrogen. A preferred class of such polymers includes polyoxyalkylene polyols. These are long chain polyols containing one or more chains of connected oxyalkylene groups. Most desirably, these polyoxalkylene polyols are liquids having an average molecular weight in the range of 500 to 5000.

Examples of these polyoxyalkylene polyols include polypropylene glycols having average molecular weights of 500 to 5000, and reaction products of propylene oxide with linear diols and higher polyols, said higher polyols when employed as reactants giving rise to branched polyoxyalkylene polyols; and ethylene oxide-propylene oxide copolymers having average molecular weights of 500 to 5000 and in which the weight ratio of ethylene oxide to propylene oxide ranges between 10:90 and 90:10, including reaction products of mixtures of ethylene oxide and propylene oxide in the said ratios with linear diols and higher polyols.

Examples of linear diols referred to as reactants with one or more alkylene oxides include ethylene glycol, propylene glycol, 2-ethylhexanediol-1,3 and examples of higher polyols include glycerol, trimethylolpropane, 1,2,6-hexanetriol, pentaerythritol and sorbitol.

Another class of polyoxyalkylene polyols are the so-called block copolymers having a continuous chain of one type of oxyalkylene linkage connected to blocks of another type of oxyalkylene linkage. Examples of such block copolymers are reaction products of polypropylene glycols having average molecular weights of 500 to 5000 with an amount of ethylene oxide equal to 5 to 25% by weight of the starting polypropylene glycol. Another class of such block copolymers is represented by the corresponding reaction products of propylene oxide with polyethylene glycols.

Further examples of the class of polyoxyalkylene polyols include polyethylene glycols, polybutylene glycols and copolymers, such as polyoxyethyleneoxybutylene glycols and polyoxypropyleneoxybutylene glycols. Included in the term "polybutylene glycols" are polymers of 1,2-butylene oxide, 2,3-butylene oxide and 1,4-butylene oxide.

Among the polyesters which are suitable reactants for isocyanates are those having reactive hydrogen-containing terminal groups, preferably predominantly hydroxyl groups. Polyesters are reaction products of polyols, such as the aforementioned aliphatic polyols and in particular the class of aliphatic polyols containing from two to ten carbon atoms, with polycarboxylic acids having from two to thirty-six carbon atoms, e.g., oxalic acid, succinic acid, maleic acid, adipic acid, sebacic acid, isosebacic acids, phthalic acids, and dimer acids such as those obtained by coupling two molecules of linoleic acid.

Another preferred class of polymers having terminal groups that contain reactive hydrogen atoms and are suitable for reaction with polyisocyanates are the lactone polymers, preferably those having molecular weights within the range of about 500 to 10,000. These include polymers formed by reaction of polyfunctional initiators having reactive hydrogen atoms with one or more lactones, whereby the lactone rings are successively opened and added to one another as lactone residues to form long chains, as well as copolymers in which there are random or ordered distributions of opened lactone residues and alkylene oxides in the chain, and block copolymers thereof. The lactones that are particularly suitable in polymers and copolymers of this type are the epsilon-caprolactones, preferably the unsubstituted caprolactones and caprolactones having up to about three alkyl substituents on the ring. The lactone residues in heteric and block copolymers may be linked by oxyalkylene chains derived from ethylene oxide, propylene oxide, butylene oxide or the like, and by polyoxyalkylene chains, e.g., polyoxypropylene, polyoxyethylene, polyoxybutylene chains or mixtures or copolymers thereof.

It is also to be understood that a compound containing reactive NCY groups and reactive hydrogen, such as a prepolymeric reaction product of any of the foregoing polymers with an isocyanate, can be reacted with itself or with a compound containing reactive hydrogen, such as water, a polyol or an amino-alcohol.

It is to be expected that numerous modifications will readily become apparent to those skilled in the art upon reading this description. All such modifications are intended to be included within the scope of the invention as defined in the appended claims.

We claim:

1. Method which comprises reacting an organic compound containing a reactive NCY group in which Y is a member selected from the group consisting of oxygen and sulfur with a substance having reactive hydrogen as determined by the Zerewitinoff method in contact with a catalytic amount of a catalyst selected from the group consisting of isopropoxystearoxy polystannate and hydroxystearoxy polystannate.

2. Method which comprises reacting an organic isocyanate with a substance having reactive hydrogen as determined by the Zerewitinoff method in contact with a catalytic amount of a polystannate of the group consisting of isopropoxystearoxy polystannate and hydroxystearoxy polystannate.

References Cited in the file of this patent

UNITED STATES PATENTS

| 2,897,181 | Windemuth | July 28, 1959 |
| 2,933,462 | Fischer | Apr. 19, 1960 |

FOREIGN PATENTS

| 769,681 | Great Britain | Mar. 13, 1957 |
| 860,109 | Germany | Dec. 18, 1952 |

OTHER REFERENCES

Hackh's "Chemical Dictionary," 3rd Edition, page 599, published by Blakiston Co., Philadelphia, Pa.

Noller: "Chemistry of Organic Compounds," copyright, 1951, pages 819–821, published by W. B. Saunders Co., Philadelphia, Pa.